(12) United States Patent
Shumway

(10) Patent No.: US 9,890,321 B2
(45) Date of Patent: Feb. 13, 2018

(54) WELLBORE SERVICING COMPOSITIONS AND METHODS OF MAKING AND USING SAME

(71) Applicant: Halliburton Energy Services, Inc., Houston, TX (US)

(72) Inventor: William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 18 days.

(21) Appl. No.: 13/657,326

(22) Filed: Oct. 22, 2012

(65) Prior Publication Data

US 2014/0113843 A1  Apr. 24, 2014

(51) Int. Cl.
*C09K 8/524* (2006.01)
*C09K 8/74* (2006.01)

(52) U.S. Cl.
CPC ............. *C09K 8/524* (2013.01); *C09K 8/74* (2013.01)

(58) Field of Classification Search
CPC .......... C09K 8/68; C09K 8/805; C09K 8/508; C09K 8/62; C09K 8/865; C09K 8/80; C09K 8/512; C09K 8/5751; C09K 8/74; C09K 8/50; C09K 8/56; C09K 8/5753; C09K 8/64; C09K 8/66; C09K 8/5083; C09K 8/506; C09K 8/887; C09K 2208/18; C09K 2208/32; C09K 8/035; C09K 8/12; C09K 8/5086; C09K 8/514; C09K 8/518; C09K 8/528; C09K 8/5756; C09K 8/588; C09K 8/72; C09K 8/76; C09K 8/38; C09K 8/78; C09K 8/90; C09K 2208/02; C09K 2208/10; C09K 2208/12; C09K 2208/26; C09K 8/02; C09K 8/26; C09K 8/32; C09K 8/36; C09K 8/426; C09K 8/502; C09K 8/516; C09K 8/52; C09K 8/524; C09K 8/602
See application file for complete search history.

(56) References Cited

U.S. PATENT DOCUMENTS

| | | | |
|---|---|---|---|
| 5,238,065 A * | 8/1993 | Mondshine | C09K 8/52 166/300 |
| 5,888,944 A | 3/1999 | Patel | |
| 6,029,755 A | 2/2000 | Patel | |
| 6,218,342 B1 | 4/2001 | Patel | |
| 6,405,809 B2 | 6/2002 | Patel et al. | |
| 6,608,006 B2 | 8/2003 | Taylor et al. | |
| 6,790,811 B2 | 9/2004 | Patel | |
| 6,793,025 B2 | 9/2004 | Patel et al. | |
| 6,806,233 B2 | 10/2004 | Patel | |
| 6,877,563 B2 | 4/2005 | Todd et al. | |
| 6,989,354 B2 | 1/2006 | Thaemlitz et al. | |
| 7,021,383 B2 | 4/2006 | Todd et al. | |
| 7,431,088 B2 | 10/2008 | Moorehead et al. | |
| 7,435,706 B2 | 10/2008 | Mueller et al. | |
| 7,455,112 B2 | 11/2008 | Moorehead et al. | |
| 7,638,466 B2 | 12/2009 | Mueller et al. | |
| 7,906,464 B2 | 3/2011 | Davidson | |
| 7,992,656 B2 | 8/2011 | Dusterhoft et al. | |
| 8,091,644 B2 | 1/2012 | Clark et al. | |
| 8,091,645 B2 | 1/2012 | Quintero et al. | |
| 8,105,989 B2 | 1/2012 | Svoboda et al. | |
| 8,220,548 B2 | 7/2012 | Carbajal et al. | |
| 2007/0000839 A1 * | 1/2007 | Wright | B03D 1/016 210/660 |
| 2007/0173416 A1 | 7/2007 | Moorehead et al. | |
| 2008/0110618 A1 * | 5/2008 | Quintero | C09K 8/32 166/278 |
| 2008/0169102 A1 * | 7/2008 | Carbajal | C09K 8/52 166/300 |
| 2008/0169103 A1 | 7/2008 | Carbajal et al. | |
| 2008/0314592 A1 * | 12/2008 | Clark | C09K 8/52 166/301 |
| 2009/0286701 A1 * | 11/2009 | Davidson | C09K 8/52 507/235 |
| 2009/0291863 A1 * | 11/2009 | Welton | C09K 8/528 507/219 |
| 2009/0298720 A1 * | 12/2009 | Nguyen | C09K 8/685 507/204 |
| 2010/0096139 A1 * | 4/2010 | Holcomb | C09K 8/536 166/308.1 |
| 2010/0319919 A1 * | 12/2010 | Bustos | C09K 8/36 166/293 |
| 2011/0120712 A1 * | 5/2011 | Todd | C04B 28/02 166/280.1 |
| 2012/0208726 A1 * | 8/2012 | Smith | C09K 8/26 507/201 |
| 2012/0279711 A1 * | 11/2012 | Collins | C09K 8/508 166/300 |
| 2013/0118759 A1 * | 5/2013 | Crews | E21B 29/00 166/376 |

OTHER PUBLICATIONS

H. C. H. Darley, George R. Gray, Composition and Properties of Drilling and Completion Fluids, 5th Edition, Gulf Publishing Company, 1988, pp. 328-332.*

(Continued)

*Primary Examiner* — Kumar R Bhushan
(74) *Attorney, Agent, or Firm* — Haynes and Boone, LLP

(57) ABSTRACT

A method of servicing a wellbore in a subterranean formation comprising placing a composition comprising an acid and/or an acid precursor, a surfactant, and an aqueous base fluid into contact with oil-wet solids in the wellbore; wherein the acid and/or acid precursor is selected from the group consisting of acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; sulphinic acid; phosphoric acid; phosphorous acid; phosphonic acid; phosphinic acid; sulphamic acid; aliphatic polyesters; glucono-delta-lactone; glucoheptonic lactone; poly(ε-caprolactones); poly(hydroxybutyrates); poly(anhydrides); aliphatic polycarbonates; poly(amino acids); polyphosphazenes; poly (ortho esters); or combinations thereof.

21 Claims, No Drawings

(56) References Cited

OTHER PUBLICATIONS https://scifinder.cas.org/scifinder/view/substance/substanceDetail.jsf?nav=eNpb85aBtYSB . . . downloaded on Sep. 4, 2016.*
http://pediatrics.aappublications. org/content/92/2/265 downloaded on Sep. 4, 2016.*
https://en.wikipedia.org/w/ index.php?title=Dimercaprol &printable=yes downloaded on May 31, 2017.*
Halliburton Product Data Sheet entitled, "BDF™-442, Filter Cake Breaker," Baroid, Mar. 25, 2010, 1 page, Halliburton.
Halliburton Product Data Sheet entitled, "CFS™-485, Casing Cleaner," Baroid, Mar. 25, 2010, 1 page, Halliburton.
Halliburton Product Data Sheet entitled, "N-Flow™-408, Filter Cake Breaker," Baroid, Mar. 26, 2010, 1 page, Halliburton.
Halliburton Product Data Sheet entitled, "N-Flow™-412, Filter Cake Breaker," Baroid, Mar. 26, 2010, 1 page, Halliburton.
Halliburton Product Data Sheet entitled, "N-Flow™-457, Filter Cake Breaker," Baroid, Mar. 26, 2010, 1 page, Halliburton.
Foreign communication from a related counterpart application—International Search Report and Written Opinion, PCT/US2013/061414, dated Dec. 20, 2013, 11 pages.
Patent Examination Report received from the Australian Patent Office in corresponding Australian Application No. 2013335191, dated Jun. 12, 2012, 3 pages.
Patent Examination Report received from the Canadian Patent Office in corresponding Canadian Application No. 2889135, dated Jun. 10, 2015, 3 pages.
Patent Examination Report received from the European Patent Office in corresponding European Application No. 13773524.7, dated Feb. 17, 2016, 6 pages.
Patent Examination Report received from the Canadian Patent Office in corresponding Canadian Application No. 2,889,135, dated Jan. 22, 2016, 4 pages.
Official Action received from the Eurasian Patent Organization in corresponding Eurasian Application No. 201590765, dated May 25, 2016, 4 pages.
Patent Examination Report received from the European Patent Office in corresponding European Application No. 13773524.7, dated Jun. 7, 2016, 6 pages.

* cited by examiner

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field

This disclosure relates to methods of servicing a wellbore. More specifically, it relates to methods of treating a wellbore to remove filter cakes having oil-wet components.

Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

During the drilling operation, a drilling fluid, also referred to as drilling mud, is conventionally circulated through the wellbore as the borehole is drilled. The presence of such a drilling mud aids in the drilling operation, for example, by removing cuttings from the wellbore, (e.g., by suspending and releasing cuttings returned to the surface), controlling pressures within the subterranean formation, sealing permeable and/or semi-permeable portions of the subterranean formation, stabilizing the subterranean formation, cooling and lubricating the drilling apparatus, and facilitating completion operations. As the drilling mud is circulated through the wellbore during a drilling operation, the drilling mud is deposited on the surfaces of the growing wellbore in a thin, low-permeability layer known as a filter cake, thus inhibiting the loss of mud and/or mud filtrate or other wellbore fluids to the formation during the drilling and/or other servicing operations. Prior to production, the filtercake is removed to allow the unimpeded flow of natural resources to the wellbore. An ongoing challenge is to both efficiently remove the filtercake while minimizing damage to the formation or the wellbore. Accordingly, an ongoing need exists for more effective compositions and methods of removing filter cakes in subterranean formations.

SUMMARY

Disclosed herein is a method of servicing a wellbore in a subterranean formation comprising placing a composition comprising an acid and/or an acid precursor, a surfactant, and an aqueous base fluid into contact with oil-wet solids in the wellbore; wherein the acid and/or acid precursor is selected from the group consisting of acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; sulphinic acid; phosphoric acid; phosphorous acid; phosphonic acid; phosphinic acid; sulphamic acid; aliphatic polyesters; glucono-delta-lactone; glucoheptonic lactone; poly($\epsilon$-caprolactones); poly(hydroxybutyrates); poly(anhydrides); aliphatic polycarbonates; poly(amino acids); polyphosphazenes; poly(ortho esters); or combinations thereof.

Also disclosed herein is a method of servicing a wellbore comprising placing a composition comprising an acetate and/or lactate ester into contact with oil-wet solids in the wellbore under conditions wherein the acetate and/or lactate ester hydrolyzes to release acetic and/or lactic acid; wherein the acetic and/or lactic acid catalyzes the hydrolysis of additional acetate and/or lactate ester, and wherein all or a portion of the acetate and/or lactate ester converts at least a portion of the oil-wet solids to water-wet solids.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing compositions comprising an acid and/or an acid precursor, a surfactant, and an aqueous base fluid. In some embodiments, the wellbore serving composition may further comprise a rate adjustment material and/or a wetting agent as well as other optional components as disclosed herein. In an embodiment, the composition may be used for the removal of oil-based filter cakes. In some embodiments, the composition may be used for the removal of a water-based filter cake containing oil-wet components. In other embodiments, the composition may be used for the removal of a water-based filter cake that has been contaminated with oil-wet components (e.g., crude oil). Hereinafter, the disclosure will refer to the compositions, designated a COMP, for the removal of an oil-based filter cake, although the removal of other materials of the type disclosed herein are also contemplated. For example, a COMP of the type disclosed herein may be used to treat or clean oil-wet solids such as drill cuttings transported to the surface via a drilling fluid and separated therefrom. The COMPs may be placed downhole and used to service a wellbore, for example providing for time-delayed removal of an oil-based filter cake from the wellbore. Each of the components of the COMP as well as methods of using same will be described in more detail herein.

In an embodiment, the COMP comprises an acid. Nonlimiting examples of acids suitable for use in the present disclosure include acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; sulphinic acid; phosphoric acid; phosphorous acid; phosphonic acid; phosphinic acid; sulphamic acid; or combinations thereof.

In an embodiment, the acid may be included within the COMP in a suitable amount. In an embodiment an acid of the type disclosed herein may be present within the COMP in an amount of from about 5 wt. % to about 40 wt. %, alternatively from about 5 wt. % to about 30 wt. %, or alternatively from about 10 wt. % to about 25 wt. % based on the total weight of the COMP.

In an embodiment, the COMP comprises an acid precursor in addition to or in lieu of the acid. Herein an acid precursor is defined as a material or combination of materials that provides for delayed release of one or more acidic species. Such acid precursors may also be referred to as time-delayed and/or time-released acids. Acid precursors suitable for use in this disclosure may comprise a material or combination of materials that react to generate and/or liberate an acid after a period of time has elapsed. The liberation of the acidic species from the acid precursor may be accomplished through any means known to one of ordinary skill in the art with the benefits of this disclosure and compatible with the user-desired applications. In embodiments, acid precursors may be formed by modifying acids via the addition of an operable functionality or substituent, physical encapsulation or packaging, or combinations thereof. The operable functionality and\or substituent may be acted upon in any fashion (e.g., chemically, physically, thermally, etc.) and under any conditions compatible with the process in order to release the acid at a desired time and/or under desired conditions such as in situ wellbore conditions. In an embodiment, the acid precursor comprises at least one modified acid (e.g., having an operable functionality, encapsulation, packaging, etc.) such that when acted upon and/or in response to pre-defined conditions (e.g., in situ wellbore conditions such as temperature, pressure, chemical environment), an acid is released. In an embodiment, the acid precursor may comprise an acidic species that is released after exposure to an elevated temperature such as an wellbore temperature which are higher with respect to the surface temperature at the wellbore. In an embodiment, the acid precursor comprises a material which reacts with one or more components of the COMP (e.g., reacts with an aqueous fluid present in the COMP) to liberate at least one acidic species.

In an embodiment, the acid precursor generally refers to a component, which itself does not act as an acid by significantly decreasing the pH of a solution into which it is introduced, but which, upon degradation, will yield one or more components capable of acting as an acid by decreasing the pH of that solution. In an embodiment an acid precursor may yield one or more components capable of decreasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

In an embodiment, the acid precursor comprises a reactive ester. Hereinafter, for simplicity, the remainder of the disclosure will focus on the use of a reactive ester as the acid precursor with the understanding that other acid precursors may be used in various embodiments. The reactive ester may be converted to an acidic species by hydrolysis of the ester linkage, for example by contact with water present in the aqueous fluid of the COMP and/or water present in situ in the wellbore. In an embodiment, the acid precursor may comprise a lactone or lactide, a lactate ester, an acetate ester, a polyester, or combinations thereof.

In an embodiment, the acid precursor comprises esters and/or polyesters of acids of the type described previously herein; esters and/or polyesters of polyols (e.g., glycerol, glycols) with acids of the type described previously herein; aliphatic polyesters; glucono-delta-lactone; glucoheptonic lactone; poly($\epsilon$-caprolactones); poly(hydroxybutyrates); poly(anhydrides); aliphatic polycarbonates; poly(amino acids); polyphosphazenes; poly(ortho esters); orthoesters (which may also be known as "poly ortho esters" or "ortho esters); or combinations thereof. Nonlimiting examples of acid precursors suitable for use in the present disclosure include methyl lactate, ethyl lactate, propyl lactate, butyl lactate, trilactin, polylactic acid, poly(lactides), methyl acetate, ethyl acetate, propyl acetate, butyl acetate, monoacetin, diacetin, triacetin, glyceryl diacetate, glyceryl triacetate, tripropionin (a triester of propionic acid and glycerol), methyl glycolate, ethyl glycolate, propyl glycolate, butyl glycolate, poly(glycolides), or combinations thereof.

In an embodiment, the acid precursor may be characterized as exhibiting a suitable delay time. As used herein, the term "delay time" refers to the period of time from when an acid precursor, or a combination of acid precursors, is introduced into an operational environment until the acid precursor or combination of precursors has degraded a sufficient degree to alter (i.e., begin to degrade) the filter cake, as will be disclosed herein. As will be appreciated by one of skill in the art viewing this disclosure, differing acid precursors may exhibit varying delay times. As such, in an embodiment, an acid precursor, or combination of acid precursors, may be selected for inclusion in a wellbore servicing fluid such that the acid precursor(s) exhibit a desired average delay time. In an embodiment, the acid precursor may exhibit an average delay time of at least about 1 hour, alternatively, at least about 2 hours, alternatively, at least about 4 hours, alternatively, at least about 8 hours, alternatively, at least about 12 hours, or alternatively, at least about 24 hours.

In an embodiment, the acid precursor may be characterized as operable within a suitable temperature range. As will be appreciated by one of skill in the art viewing this disclosure, differing acid precursors may exhibit varying temperature ranges of operability. As such, in an embodiment, an acid precursor, or combination of acid precursors, may be selected for inclusion in the wellbore servicing fluid such that the acid precursor(s) exhibit a user and/or process-desired operable temperature range (e.g., an ambient downhole temperature for a given wellbore). In addition, as will also be appreciated by one of skill in the art viewing this disclose, the degradation of the acid precursor may be influenced by the temperature of the operational environment. For example, the rate of degradation of a given acid precursor may generally be higher at higher temperatures. As such, the rate of degradation of a given acid precursor may be generally higher when exposed to the environment within the wellbore as compared to the temperature at the surface of the wellbore. In an embodiment, the acid precursor may exhibit an operable temperature range of from about 75° F. to about 195° F., alternatively from about 165° F. to about 230° F., or alternatively from about 195° F. to about 400° F.

In an embodiment, the acid precursor may be included within the COMP in a suitable amount. The concentration of the acid precursor within the COMP may be selected to achieve a given concentration of acid upon degradation of the acid precursor. The resultant concentration and/or amount of acid that is necessary may be dependent upon a variety of factors such as the composition of the base fluid, the presence or absence of various additives; the composition of the filter cake; the thickness of the filter cake; the temperature of the operational environment (e.g., the wellbore); the composition of the formation, the pressure of the formation, the diameter of the hole, the particular fines and damage present in the formation (e.g., scale, skin, calcium carbonate, silicates, and the like), the particular acid precursor used, the expected contact time of the generated acid with the formation; the desired amount of time necessary for removal of the filter cake; or combinations thereof. In an embodiment the acid precursor is present within the COMP in an amount of from about 2.5 wt. % to about 50 wt. %, alternatively from about 5 wt. % to about 30 wt. %, or alternatively from about 10 wt. % to about 25 wt. %, based on the total weight of the COMP. Additional disclosure on acid precursors may be found in U.S. Pat. Nos. 6,877,563; 7,021,383 and 7,455,112 and U.S. Patent Application Nos. 20070169938 A1 and 20070173416 A1, each of which is incorporated by reference herein in its entirety.

In an embodiment, the COMP comprises an acid precursor having a hydrolysable moiety (e.g. ester) as the operable functionality. In such an embodiment, the COMP may optionally comprise an effective amount of a rate adjustment material (RAM), which functions to adjust the hydrolysis rate of the acid precursor as desired. In some embodiments, the COMP may contain more than one acid precursor that functions as a RAM for one or more additional acid precursors present in the COMP. For example, the COMP may contain more than one acid precursor wherein a first acid precursor may function to rapidly generate an acidic species that influences the half-life of the hydrolysis reaction for one or more additional precursors (e.g., a second acid precursor). As such the first acidic precursor may function primarily as a RAM which controls the rate of the development of a second acidic species that is to be used in the COMP. The term "half-life" as used herein refers to the time it takes for half of the original amount of the acid precursor to react. For example, polylactic may be employed as a RAM in a wellbore servicing composition comprising an acid precursor in the form of an ester of a hydroxyl compound. Examples of other esters or polyesters that may be suitable for adjusting the half-life of the acid precursor in the COMP (i.e., acting as a RAM) include, but are not limited to, diethyleneglycol monoformate, diethyleneglycol diformate, monoethyleneglycol diformate, monoethyleneglycol monoformate, polylactic acid, lactate esters, or combinations thereof.

The particular combinations of a RAM and an acid precursor suitable for use in a COMP may be formulated by one of ordinary skill in the art with the benefits of this disclosure to produce a desired effect or profile (e.g., acid release profile) at or over a period of time. Such release profiles may include a steady increase or decrease in release rate (i.e., constant slope), exponential increase or decrease in release rate, step-wise increases or decreases in release rates, maximums and/or minimums in release rate (e.g., bell-shaped profiles), and combinations thereof.

In another embodiment, the RAM comprises one or more pH-lowering materials (e.g., acids or acidic materials). For example, the RAM may comprise small amounts of one or more reactive materials (e.g., mineral acids, organic acids, acidic anhydrides, p-toluenesulfonic acid) that decrease the pH and accelerate the hydrolysis of the acid-precursors. In other embodiments, the RAM comprises one or more pH increasing materials (e.g., bases or basic materials). For example, in some instances, such as with ortho esters, the hydrolysis rate may be slowed by the addition of a small amount of a strong base such as NaOH, $Na_2CO_3$, $NaHCO_3$ and $Mg(OH)_2$ or organic bases such as ethanolamine or other aliphatic or aromatic amine type compounds. Additional disclosure RAMs suitable for use in the present disclosure can be found in U.S. Pat. Nos. 7,906,464 and 7,455,112 each of which is incorporated by reference herein in its entirety.

In an embodiment, the COMP comprises a surfactant. The surfactant may function to improve the compatibility of the COMP with other fluids (e.g., formation fluids) that may be present in the subterranean formation. In an embodiment, a surfactant may be used to enhance the reactivity of the COMP by, for example, breaking any emulsions present from the drilling fluid system or improving the interfacial interactions between the filter cake and the COMP thereby allowing the COMP to contact the filter cake more easily. Nonlimiting examples of surfactants suitable for use in the COMP include ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocoamidopropyl betaine, quaternary ammonium compounds, trimethyltallowammonium chloride, trimethylcocoammonium chloride, or combinations thereof. Other examples of surfactants that may be suitable for use in the present disclosure include without limitation CFS-485 casing cleaner, LOSURF-300M surfactant, LOSURF-357 surfactant, LOSURF-400 surfactant, LOSURF-2000S surfactant, LOSURF-2000M surfactant, LOSURF-259 nonemulsifier, and NEA-96M surfactant. CFS-485 casing cleaner is a blend of surfactants and alcohols; LOSURF-300M surfactant is a nonionic surfactant; LOSURF-357 surfactant is a nonionic liquid surfactant; LOSURF-400 surfactant is a nonemulsifier; LOSURF-2000S surfactant is a blend of an anionic nonemulsifier and an anionic hydrotrope; LOSURF-2000M surfactant is a solid surfactant; LOSURF-259 nonemulsifier is a nonionic, nonemulsfier blend; and NEA-96M surfactant is a general surfactant and nonemulsifier all of which are commercially available from Halliburton Energy Services.

Surfactants suitable for use in the present disclosure are described in more detail in U.S. Pat. Nos. 7,992,656 and 8,220,548, each of which is incorporated by reference herein in its entirety. In an embodiment, the surfactants may be present in the COMP in an amount sufficient to prevent incompatibility with formation fluids or well bore fluids. In an embodiment, where liquid surfactants are used, the surfactants may be present in an amount of from about 0.1 wt. % to about 5 wt. %, alternatively from about 0.5 wt. % to about 4 wt. %, or alternatively from about 1 wt. % to about 3 wt. %, based on the total weight of the COMP. In an embodiment, where powdered surfactants are used, the surfactants may be present in an amount in the range of from about 0.01 wt. % to about 1 wt. %, alternatively from about 0.05 wt. % to about 0.5 wt. %, or alternatively from about 0.1 wt. % to about 0.3 wt. % based on the total weight of the COMP.

In some embodiments, it may be beneficial to add a surfactant to the COMP as it is being pumped downhole, inter allia, to help reduce the possibility of forming emulsions with the formation crude oil or injection fluids. In some embodiments, microemulsion additives optionally may be included in the COMP. Nonlimiting examples of microemulsion additives suitable for use in the present disclosure include PEN-88M surfactant, PEN-88HT surfactant, SSO-21E surfactant, SSO-21MW agent, and GASPERM 1000 service. PEN-88M surfactant is a nonionic penetrating surfactant; PEN-88HT surfactant is a high-temperature surfactant; SSO-21E surfactant is a foaming surfactant; SSO-21MW agent is a foaming surfactant and GASPERM 1000 service is a microemulsion all of which are commercially available from Halliburton Energy Services, Inc.

In those embodiments where it is desirable to foam the COMP, surfactants such as HY-CLEAN (HC-2) agent or AQF-2 foaming agent may be used. HC-2 agent is an amphoteric surfactant; AQF-2 foaming agent is an anionic surfactant and foaming agent both of which are commercially available from Halliburton Energy Services, Inc. Additional nonlimiting examples of foaming agents suitable for use in the present disclosure include betaines, amine oxides, methyl ester sulfonates, alkylamidobetaines, cocoamidopropyl betaine, alpha-olefin sulfonate, trimethyl-tallowammonium chloride, $C_{8\text{-}22}$ alkylethoxylate sulfate, and trimethylcocoammonium chloride. Other suitable foaming agents and foam stabilizing agents may be included as well, which will be known to those skilled in the art with the benefit of this disclosure.

Aqueous base fluids that may be used in the COMP include any aqueous fluid suitable for use in subterranean applications. For example, the COMP may comprise water or a brine. In an embodiment, the base fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, produced water, or combinations thereof. The salt or salts in the water may be present in an amount ranging from greater than about 0% by weight to a saturated salt solution, In an embodiment, the salt or salts in the water may be present within the base fluid in an amount sufficient to yield a saturated brine. As will be understood by one of ordinary skill in the art the type and concentration of salt solutions utilized will be dependent on the wellbore servicing fluid density (e.g., drilling fluid density) and may range from about 8.314 lb/gallon to about 20.2 lb/gallon.

Nonlimiting examples of aqueous brines suitable for use in the present disclosure include chloride-based, bromide-based, or formate-based brines containing monovalent and/or polyvalent cations, salts of alkali and alkaline earth metals, or combinations thereof. Additional examples of suitable brines include, but are not limited to: NaCl, NaBr, $CaCl_2$, $CaBr_2$, $ZnBr_2$, sodium formate, potassium formate, cesium formate, or combinations thereof. In an embodiment, the aqueous fluid comprises a brine. The aqueous fluid (e.g., brine) may be present in an amount of from about 40 wt. % to about 90 wt. % based on the total weight of the COMP. Alternatively, the aqueous fluid may comprise the balance of the COMP after considering the amount of the other components used.

In an embodiment, the COMP may optionally comprise one or more additives or additional components, as may be suitable depending upon the end use of the COMP. Such additives may include, but are not limited to, viscosifying agents, weighting agents, fluid loss control agents, thinning agents, breakers, or combinations thereof.

In an embodiment, the COMP comprises a viscosifying agent. Viscosifying agents suitable for use in the present disclosure include without limitation hydroxyethyl cellulose, xanthan gum, diutan, welam gum, guar, scleroglucan, hydrophobically modified polymers, starches and combinations thereof. In an embodiment, the viscosifying agent comprises BARAVIS viscosifier which is a cellulosic product; N-VIS viscosifier which is a clarified xanthan gum polymer; BRINEDRIL-VIS viscosifier which is a water-soluble polymer; DEXTRID LT filtration control agent which is a modified and bacterially stabilized starch product; and/or AQUAGEL viscosifier which is a treated premium grade bentonite all of which are commercially available from Halliburton Energy Services. The viscosifying agent may be present within the COMP in a range of from about 0.1 wt. % to about 6 wt. %, alternatively from about 0.1 wt. % to about 2 wt. %, or alternatively from about 0.5 wt. % to about 1 wt. % based on the total weight of the COMP.

In an embodiment, the COMP comprises a weighting agent. Nonlimiting examples of weighting agents suitable for use in the present disclosure include hematite, magnetite, iron oxides, magnesium oxides, illmenite, magnesium oxide, barite, siderite, celestite, dolomite, calcite, halite, or combinations thereof. The quantity of such material added, if any, depends upon the desired density of the final COMP. As will be appreciated by one of skill in the art viewing this disclosure, the amount of weighting agents may be varied depending upon the intended application, for example an effective amount may be selected to provide a desired density for the wellbore servicing fluid.

In an embodiment, the COMP comprises a fluid loss control agent. Nonlimiting examples of fluid loss control agents suitable for use with the present disclosure include starches, carboxymethyl cellulose, polyanionic cellulose, acrylamide polymers or combinations thereof. Nonlimiting examples of commercially available fluid loss control agents suitable for use in the present disclosure include DEXTRID filtration control agent which is starch based; PAC-L filtration control agent which is a low viscosity polyanionic cellulose; and THERMACHECK filtration control agent which is a mixture of acrylamide polymers and copolymers all of which are commercially available from Halliburton Energy Services, Inc. In an embodiment, the fluid loss control agent may be present within the COMP in an amount of less than about 10 wt. %, alternatively less than about 5 wt. %, or alternatively less than 1 wt. %, based on the total weight of the COMP.

In an embodiment, the COMP comprises a thinning agent. Nonlimiting examples of thinning agents suitable for use in the present disclosure include alkoxylated fatty alcohol, and non-ionic surfactants which comprise reaction products of ethylene oxide, propylene oxide and/or butylene oxide with $C_{10\text{-}22}$ carboxylic acids or $C_{10\text{-}22}$ carboxylic acid derivatives. Thinning agents suitable for use with the present disclosure are described in more detail in U.S. Pat. Nos. 7,435,706 and 7,638,466, each of which is incorporated by reference herein in its entirety.

In an embodiment, the thinning agent is present in an amount of from about 0.1 lb/bbl to about 10 lb/bbl, alternatively from about 0.5 lb/bbl to about 5 lb/bbl or alternatively from about 0.3 lb/bbl to about 8 lb/bbl based on thinner effectiveness and degree of thinning required.

In an embodiment, the COMP comprises a breaker. As used herein, the term "breaker" refers to a material that cooperates with the acid-precursor in the removal of the filter cake. In an embodiment, the breaker comprises an enzyme, an oxidant, a chelant, or combinations thereof.

In an embodiment, the breaker comprises xanthanase, which is an enzyme configured for the degradation of xanthan polymers. Xanthanase may also be employed within the COMP as a catalyst of ester hydrolysis. An example of a xanthanase suitable for use in the present disclosure is commercially available from Halliburton Energy Services, Inc. as a part of the N-FLOW line of service formulations.

In an embodiment, the breaker is an oxidant. Nonlimiting examples of oxidants suitable for use in the present disclosure include an oxide, a peroxide, GBW-40 breaker, SP breaker, OXOL II breaker, or combinations thereof. GBW-40 breaker is a strong oxidizer breaker, SP breaker is a water-soluble oxidizing breaker and OXOL II breaker is a delayed release oxidizing breaker all of which are commercially available from Halliburton Energy Services, Inc.

In an embodiment, the breaker is a chelant which is present in an effective amount. Nonlimiting examples of chelants suitable for use in the present disclosure include ethylenediaminetetraacetic acid, dimercaptosuccinic acid, dimercapto-propane sulfonate, α-lipoic acid, calcium disodium versante, D-penicillamine, deferoxamine, defarasirox, dimercaprol, glutamic acid diacetic acid, or combinations thereof.

In an embodiment, the COMP comprises an wetting agent. Without wishing to be limited by theory, a wetting agent may function to decrease the interfacial tension present between a water-wet surface and an oil-wet surface. Nonlimiting examples of wetting agents suitable for use in the present disclosure include tall oil, oxidized crude tall oil, organic phosphate esters, modified imidazolines and amidoamines, lecitihin, alkyl aromatic sulfates and sulfonates, or combinations thereof. Nonlimiting examples of commercially available wetting agents suitable for use in the present disclosure include EZ-MUL emulsifier, INVERMUL emulsifier, and FORTI-MUL emulsifier. EZ-MUL emulsifier is a secondary emulsifier and wetting agent; INVERMUL emulsifier is a primary emulsifier and FORTI-MUL emulsifier is a primary emulsifier and oil-wetting agent all of which are available from Halliburton Energy Services, Inc. In an embodiment, the wetting agent is present in an amount of from about 0.01 vol. % to about 3 vol. % based on the total volume of the composition.

In an embodiment, the COMP may be prepared via any suitable method or process. The components of the COMP (e.g., acid and/or acid precursor, aqueous fluid, surfactant, optional rate adjustment material) may be combined using any mixing device compatible with the composition.

In an embodiment, the COMP comprises an acid precursor, a surfactant, a wetting agent, and a brine. For example, the COMP may comprise 17 volume percent (vol. %) ethyl lactate, 2 vol. % CFS-485 casing cleaner, 5 vol. % ethyleneglycol monobutyl ether and 71 vol. % NaBr brine based on the total COLUME of the COMP and where the density of the brine ranges from about 8.8 pounds per gallon (ppg) to about 12.7 ppg In an embodiment, the COMP comprises an acid, a surfactant, a wetting agent, a breaker, and a brine. For example the COMP may comprise 15 vol. % acetic acid, 2 vol. % CFS-485 casing cleaner, 5 vol. % ethyleneglycol monobutyl ether 0.05 wt. % xanthanase, and 73 vol. % NaCl brine. Volume percentages are based on the total volume of the COMP, weight percentages are based on the total weight of the COMP and the density of the brine ranges from about 8.8 pounds per gallon (ppg) to about 10.1 ppg.

In an embodiment, a method of servicing a wellbore comprises drilling a wellbore in a subterranean formation and introducing to the formation a WSF. As used herein, a "servicing fluid" refers to a fluid used to drill, complete, work over, fracture, repair, or in any way prepare a wellbore for the recovery of materials residing in a subterranean formation penetrated by the wellbore. The servicing fluid is for use in a wellbore that penetrates a subterranean formation. It is to be understood that "subterranean formation" encompasses both areas below exposed earth and areas below earth covered by water such as ocean or fresh water.

Examples of wellbore servicing fluids include, but are not limited to, cement slurries, drilling fluids or muds, spacer fluids, lost circulation fluids, fracturing fluids or completion fluids. In an embodiment, the WSF comprises an oil-based servicing and/or drilling fluid or an aqueous based servicing and/or drilling fluid that comprises at least one oleaginous component, wherein oil coated/wet solids (e.g., filter cake, drill cuttings, etc.) are formed as a result. Nonlimiting examples of oil-based fluids suitable for use in the present disclosure include oil-based drilling or servicing fluids, invert emulsions and servicing fluids comprising substantially no aqueous component. Examples of the oleaginous component used in an oil-based servicing fluid may include without limitation olefins, kerosene, diesel oil, fuel oil, synthetic oils, linear or branched paraffins, olefins, esters, acetals, mixtures of crude oil, or combinations thereof.

A method of the present disclosure comprises contacting oil-wet solids within a wellbore with a COMP of the type described herein to effect removal of the oil from the oil-wet solids and/or conversion of the solids from oil-wet to water-wet. For example, a COMP may be placed in a wellbore and contacted with a filter cake or other oil-wet solids located down hole. The oil-wet solids when contacted with a COMP of the type disclosed herein may become water-wet, and then subsequently be degraded by the COMP. For example, upon becoming water-wet, acid from the COMP may contact and decompose one or more components of the water-wet solids (e.g., calcium-based components such as calcium carbonate contained in the filter cake).

In an embodiment, the COMP may be utilized in a drilling and completion operation. In such an embodiment, a WSF as disclosed herein is utilized as a drilling mud by being circulated through the wellbore while the wellbore is drilled in a conventional manner. As will be appreciated by one of skill in the art viewing this disclosure, as the WSF is circulated through the wellbore, a portion of the WSF is deposited on the walls (e.g., the interior bore surface) of the wellbore, thereby forming a filter cake. The solids contained in the WSF (e.g., drilling mud) may contribute to the formation of the filter cake about the periphery of the wellbore during the drilling of the well. Thus, when an oil-based drilling mud is utilized to drill a well, the solids that make up the filter cake may be described as oil-wet. In an embodiment, when the WSF is utilized as a drilling fluid, the solids present within the WSF, which may be oil-wet solids, may be incorporated within the filter cake. Therefore, in such an embodiment, a filter cake formed from during drilling while utilizing a WSF as disclosed herein may comprise various oil-wet solids. The presence of the filter cake may inhibit the loss of drilling mud (e.g., the WSF) or other fluids into the formation while also contributing to formation control and wellbore stability. In an embodiment, as the WSF is circulated through the wellbore during a drilling operation, the WSF suspends, and thereby removes drill cuttings from the wellbore; such drill cuttings may also be oil-wet.

In an embodiment, when desired (for example, upon the cessation of drilling operations and/or upon reaching a desired depth), the wellbore or a portion thereof may be prepared for completion. In completing the wellbore, it may be desirable to remove all or a substantial portion of the filter cake from the walls of the wellbore and/or to alter the character of any oil-wet surface within the wellbore. In an embodiment, removing the filter cake may comprise contacting the filter cake and/or any oil-wet surfaces, which may have been formed by the circulation of the WSF during a drilling operation. In such an embodiment, a COMP of the type disclosed herein may be placed within the wellbore. For example, the COMP may be placed subsequent to a drilling fluid (or after a spacer or other sweep fluid), and the drilling fluid is displaced and the COMP is distributed over a length of filtercake within the wellbore. In an embodiment, when a sufficient quantity of the COMP has been placed within the wellbore, the COMP may be allowed to remain in contact with the filter cake and/or any oil-wet surfaces for a sufficient period of time that the acid precursor within the COMP will generate a sufficient quantity of acid to convert a water-in-oil emulsion to an oil-in-water emulsion. For example, in such an embodiment the COMP may be allowed to remain in contact with the filter cake and/or any oil-wet surfaces for a soak-period, for example, for a period of time of at least about 1 hour, alternatively at least about 4 hours, alternatively at least about 8 hours, alternatively at least about 16 hours, alternatively at least about 24 hours, alternatively at least about 36 hours, alternatively at least about 48 hours, alternatively at least about 60 hours, alternatively at least about 72 hours, alternatively at least about 84 hours, alternatively at least about 100 hours. In an embodiment, during such a "soak period," the fluids within the wellbore may remain in a substantially static state, for example, as opposed to a dynamic state in which circulation may be present. In an embodiment, the wellbore may be shut-in while the COMP remains in contact with the filter cake and/or any oil-wet surfaces.

Without wishing to be limited by theory, as the acid precursor is converted to an acid (e.g., hydrolyzes) within the wellbore, the acid generated by the acid precursor may function to convert any water-in-oil emulsions present to an oil-in-water emulsion thus the oil-wet particles of the filter cake and/or any other oil-wet surfaces may become water-wet. Additionally, the conversion to a water-wet state may allow the acid generated by the acid-precursor to contact and, thereby, dissolve or degrade any acid-soluble particles within the filter cake and/or any acid-soluble particles having oil-wet surfaces, thereby causing the filter cake and/or any oil-wet surfaces to degrade. As such, the filter cake may be removed. Additionally, in an embodiment, the resulting oil-in-water emulsion has a relatively low viscosity. Thus, the oil-in-water emulsion is less likely to plug the subterranean formation and, thus, less likely to cause damage to the formation.

In an embodiment, the method of using a COMP of the type disclosed herein may further comprise completing the wellbore. In such an embodiment, the wellbore, or a portion thereof, may be completed by providing a casing string within the wellbore and cementing or otherwise securing the casing string within the wellbore. In such an embodiment, the casing string may be positioned (e.g., lowered into) the wellbore to a desired depth prior to, concurrent with, or following provision of the COMP and/or degradation of the filter cake. When the filter cake has been sufficiently degraded and/or removed from the wellbore, the COMP may be displaced from the wellbore by pumping a flushing fluid, a spacer fluid, and/or a suitable cementitious slurry downward through an interior flowbore of the casing string and into an annular space formed by the casing string and the wellbore walls. When the cementitious slurry has been so-positioned, the cementitious slurry may be allowed to set.

In an additional embodiment, the COMP may be utilized in a formation evaluation operation, for example, by electronically logging the wellbore. For example, in an embodiment, the wellbore may be evaluated via electronic logging techniques following sufficient contact between the filter cake and the COMP to degrade the filter cake, as disclosed herein. In such an embodiment, a method of evaluating a formation utilizing a COMP of the type disclosed herein may generally comprise circulating a WSF during a drilling operation and, upon the cessation of drilling operations and/or upon reaching a desired depth, removing the filter cake and/or any oil-wet surfaces from within the wellbore utilizing a COMP, as disclosed herein above. Upon sufficient removal of the filter cake and/or conversion of the oil-wet surfaces to water-wet surfaces, logging tools may be run into the wellbore to a sufficient depth to characterize a desired portion of the subterranean formation penetrated by the wellbore.

In another embodiment, a COMP of the type disclosed herein may be utilized to wash or clean-up drill cuttings removed from a wellbore. For example drill cuttings removed from a wellbore may comprise oil-wet surfaces. In an embodiment, drill cuttings removed from a wellbore drilling utilizing a WSF may be contacted with and allowed to remain in contact with a COMP, as disclosed herein, for a period of time sufficient to allow the oil-wet surfaces of the drill cuttings to be converted to a water-wet state. For example, oil-wet drill cuttings may be contacted with a COMP in a storage vessel, and the COMP may aid in cleaning the oil-wet cutting during storage and/or transport of the drill cuttings in the vessel (e.g., during storage and/or transport from an offshore drill site to an onshore treatment and/or disposal site.)

In an embodiment, the COMP comprises an acid-precursor. In an embodiment, the components of the COMP are combined at the well site; alternatively, the components of the COMP are combined off-site and are transported to and used at the well site. The contacting of the components of the COMP may initiate hydrolysis of the acid precursor by the aqueous fluid, for example via hydrolysis and dissociation of ester groups present in the precursors. Release of one or more acidic species from the acid precursor will decrease the pH of the COMP and accelerate hydrolysis of any additional acid precursors present. The COMP may be designed so as to produce the acidic species in situ (e.g., within the wellbore) following placement at some user and/or process-desired location. Thus, the pH of the COMP at the time of placement of the COMP (e.g., pumping) down hole may not be as low (i.e., may be less acidic) than would be the case if a COMP comprising the acid instead of the acid precursor was pumped into the well bore. A COMP comprising an acid precursor may act in a delayed fashion to remove a filter cake present in the wellbore when compared to a COMP comprising an acidic species. For example, a COMP comprising an acid precursor when contacted with a filtercake may result in removal of the filtercake in a time frame that is delayed from about 1 hour to about 100 hours, alternatively equal to or greater than about 3 hours, alternatively equal to or greater than about 24 hours, alternatively equal to or greater than about 2 days when compared to a COMP comprising an acid species. As noted previously, the extent of the delay may be adjusted by one of ordinary skill in the art with the benefit of this disclosure to meet the needs of the process by adjusting the nature of the precursors used (e.g., compound type, amounts, delaying mechanism employed, etc.) or through the addition of RAMs as described earlier. The COMPs disclosed herein may result in the removal of oil-wet solids (e.g., filter cake) in a time delayed fashion so as to allow for the efficient removal of oil-wet solids while minimizing damage to the formation or to allow for other servicing operations. For example, a time delay in removing the filter cake may provide sufficient time for the COMP to become fully and evenly distributed along a desired section of the wellbore after it is introduced to the wellbore. Such even treatment prevents isolated break-through zones in the filter cake that may undesirably divert subsequent servicing fluids placed downhole. Also, time delays in removing the filter cake may allow for subsequent servicing steps such as removing servicing tools from the wellbore. Following treatment with a COMP, production can then take place, if desired or appropriate, as for example in a hydrocarbon-producing well. In an embodiment, following the intended used of a COMP of the type disclosed herein in a wellbore servicing operation the material may be pumped back to the surface to be captured and disposed of or subjected to further processing such as brine reclamation. In an embodiment the components of the COMP are separated by a process in which the material is oxidized using any suitable methodology and subsequently separated from the brine.

In an embodiment, one or more of the solids within the WSF may comprise oil-wet solids. As the term is used herein, the term "oil-wet solids" refers to any particulate solid that is either intentionally or unintentionally a component of the WSF as determined by one or more of the following tests. A small portion of the solids are clumped together to form a small ball or mass. This small ball or mass is carefully dropped into a container holding water or some other aqueous fluid such as brine, sea water, or the like. If the clump or small ball of solid particles readily breaks apart and disperses, the solids are considered to be water-wet. If, however, the clump or small ball sinks and forms a reasonably consolidated mass on the bottom of the container, the solids are considered to be oil-wet. Another test is to place a small portion of the solids in the bottom of a test tube. If, upon the addition of water followed by agitation, the mass at the bottom of the tube is readily suspended in the water, the solids are considered to be water-wet. If, however, the mass of particles are difficult to break apart or to suspend upon agitation, the solids are considered to be oil-wet. A similar test may be conducted utilizing a clear oil in place of the water, in which case the water-wet solids will be difficult to suspend and the oil-wet solids will readily break-up and become suspended in the oil.

In an embodiment, the COMP and methods of using the same disclosed herein may be advantageously employed in the performance of one or more wellbore servicing operations. For example, the usage of an invert emulsion fluid as the WSF in conjunction with a COMP allows for improved wellbore/filter cake clean-up, for example, in the preparation of a wellbore for completion and/or production. For example when utilizing WSF having a COMP comprising an acid precursor or a weak acid (e.g., acetic acid, lactic acid) the WSF can be positioned within the wellbore before any acid begins to degrade the filter cake. That is, because the acid precursor is not, itself, an acid, it can be positioned within the wellbore before the action of such an acid causes degradation of the filter cake.

Additionally, in an embodiment, a COMP of the type disclosed herein may also allow for improved wellbore clean-up by providing for the removal of emulsion fluids from the formation itself (e.g., from the pores within the subterranean formation into which the wellbore has been drilled). For example, conventional drilling fluids and/or methods typically employed to prepare wellbores for completion and/or production may result in the presence of emulsion fluids within the pores of the formation. Without wishing to be limited by theory, by thoroughly converting the emulsion fluids from an oil-wet phase (e.g., as a water-in-oil emulsion) to a water-wet phase (e.g., as an oil-in-water emulsion), any invert emulsion fluids that may have flowed into the formation can flow out. As such, the COMPs disclosed herein allow for a more complete removal of the invert emulsion fluids from the wellbore and/or the surrounding formation, thereby improving the productivity of the well.

Further, without wishing to be limited by theory, by thoroughly converting the emulsion fluids from an oil-wet phase (e.g., as a water-in-oil emulsion) to a water-wet phase (e.g., as an oil-in-water emulsion), subsequent wellbore completion operations, for example, well cementing operations, may also be improved in that, because the wellbore surfaces may be substantially water-wet (as opposed to being oil-wet or, water-wet to a lesser degree), cementitious compositions introduced into the wellbore (e.g., for the purpose of completing the wellbore, isolating adjacent zones of the formation, sealing the annular space formed by the casing, or the like) may better adhere thereto, may maintain the desired rheological properties and/or may demonstrate improved strength characteristics.

In an embodiment, the COMP excludes a mutual solvent and/or a mutual solvent precursor. In an embodiment, the COMP comprises a mutual solvent and/or a mutual solvent precursor in an amount of less than about 20 wt. %, 19 wt. %, 18 wt. %, 17 wt. %, 16 wt. %, 15 wt. %, 14 wt. %, 13 wt. %, 12 wt. %, 11 wt. %, 10 wt. %, 9 wt. %, 8 wt. %, 7 wt. %, 6 wt. %, 5 wt. %, 4 wt. %, 3 wt. %, 2 wt. %, or 1 wt. %, based on the total weight of the COMP. Herein a mutual solvent refers to a material that is miscible with more than one class of liquids, such materials may also be referred to as coupling agents because such materials can cause two ordinarily immiscible liquids to combine with each other. Herein a mutual solvent precursor is defined as a mutual solvent or coupling agent that has been modified to provide for delayed release of the mutual solvent. Such mutual solvent precursors may also be referred to as time-delayed and/or time-released mutual solvents. Typically, a mutual solvent and/or mutual solvent precursor is contacted with oil-wet solids (e.g., an oil-based filtercake) and converts the material from oil-wet to water-wet thus increasing its susceptibility to degradation by the acidic species. Nonlimting examples of mutual solvents include glycol ethers such as ethylene glycol monobutylether (EGMBE) or propylene glycol monobutylether; methanol; isopropyl alcohol; alcohol ethers; aldehydes; ketones; aromatic solvents; derivatives thereof; and combinations thereof. In an embodiment, methods disclosed herein for removal of an oil-based filtercake or oil-wet components from a wellbore exclude contacting the oil-wet components with a mutual solvent comprising a water-soluble polar organic solvent. Additional advantages of the WSF system and/or the methods of using the same may be apparent to one of skill in the art viewing this disclosure.

The exemplary COMP disclosed herein may directly or indirectly affect one or more components or pieces of equipment associated with the preparation, delivery, recapture, recycling, reuse, and/or disposal of the disclosed COMP. For example, the disclosed COMP may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary COMP. The disclosed COMP may also directly or indirectly affect any transport or delivery equipment used to convey the COMP to a well site or downhole such as, for example, any transport vessels, conduits, pipelines, trucks, tubulars, and/or pipes used to fluidically move the COMP from one location to another, any pumps, compressors, or motors (e.g., topside or downhole) used to drive the COMP into motion, any valves or related joints used to regulate the pressure or flow rate of the COMP, and any sensors (i.e., pressure and temperature), gauges, and/or combinations thereof, and the like. The disclosed COMP may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The following are additional enumerated embodiments of the concepts disclosed herein.

A first embodiment which is a method of servicing a wellbore in a subterranean formation comprising placing a composition comprising an acid and/or an acid precursor, a surfactant, and an aqueous base fluid into contact with oil-wet solids in the wellbore wherein the acid and/or acid precursor is selected from the group consisting of acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; sulphinic acid; phosphoric acid; phosphorous acid; phosphonic acid; phosphinic acid; sulphamic acid; aliphatic polyesters; glucono-delta-lactone; glucoheptonic lactone; poly($\epsilon$-caprolactones); poly(hydroxybutyrates); poly(anhydrides); aliphatic polycarbonates; poly(amino acids); polyphosphazenes; poly(ortho esters); or combinations thereof.

A second embodiment which the method of the first embodiment wherein the acid precursor comprises polyol esters.

A third embodiment which is the method of any of the first through second embodiments wherein the polyols comprise glycerol, glycols, or combinations thereof.

A fourth embodiment which is the method of any of the first through third embodiments wherein the polyols esters comprise tripropionin (a triester of propionic acid and glycerol); esters of acetic acid and glycerol; monoacetin; diacetin; triacetin; glyceryl diacetate; glyceryl triacetate; or combinations thereof.

A fifth embodiment which is the method of any of the first through fourth embodiments wherein the acid and/or acid precursor comprises methyl lactate, ethyl lactate, propyl lactate, butyl lactate, methyl acetate, ethyl acetate, propyl acetate, butyl acetate, methyl glycolate, ethyl glycolate, propyl glycolate, butyl glycolate, trilactin, polylactic acid, poly(lactides), poly(glycolides), or combinations thereof.

A sixth embodiment which is the method of any of the first through fifth embodiments wherein the acid and/or acid precursor is present in the composition in an amount of from about 2.5 wt. % to about 50 wt. % based on the total weight of the composition.

A seventh embodiment which is a method of any of the first through sixth embodiments wherein the surfactant comprises ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaine; cocoamidopropyl betaine, quaternary ammonium compounds, trimethyltallowammonium chloride, trimethylcocoammonium chloride, or combinations thereof.

An eight embodiment which is the method of any of the first through seventh embodiments wherein the surfactant is present in the composition in an amount of from about 0.1 wt. % to about 5 wt. %, based on the total weight of the composition.

A ninth embodiment which is the method of any of the first through eighth embodiments wherein the aqueous base fluid comprises a brine.

A tenth embodiment which is the method of the ninth embodiment wherein the brine comprises NaCl, NaBr, $CaCl_2$, $CaBr_2$, $ZnBr_2$, sodium formate, potassium formate, cesium formate, or combinations thereof.

An eleventh embodiment which is the method of any of the ninth through tenth embodiments wherein the brine is present in the composition in an amount of from about 40 wt. % to about 90 wt. %, based on the total weight of the composition.

A twelfth embodiment which is the method of any of the first through eleventh embodiments wherein the composition further comprises a wetting agent.

A thirteenth embodiment which is the method of the twelfth embodiment wherein the wetting agent comprises crude tall oil, oxidized crude tall oil, lecithin, organic phosphate esters, modified imidazolines and amidoamines, alkyl aromatic sulfates and sulfonates, or combinations thereof.

A fourteenth embodiment which is the method of any of the twelfth through thirteenth embodiments wherein the wetting agent is present in an amount of from about 0.01 vol. % to about 3 vol. %, based on the total volume of the composition.

A fifteenth embodiment which is a method of any of the first through fourteenth embodiments wherein the composition optionally comprises a rate adjustment material, a viscosifying agent, a weighting agent, a fluid loss control agent, a thinning agent, a breaker, or combinations thereof.

A sixteenth embodiment which is a method of the fifteenth embodiment wherein the rate adjustment material comprises diethyleneglycol monoformate, diethyleneglycol diformate, monoethyleneglycol diformate, monoethyleneglycol monoformate, polylactic acid, lactate esters, or combinations thereof.

A seventeenth embodiment which is a method of any of the first through sixteenth embodiments wherein the oil-wet solids comprise a filter cake.

An eighteenth embodiment which is a method of servicing a wellbore comprising placing a composition comprising an acetate and/or lactate ester into contact with oil-wet solids in the wellbore under conditions wherein the acetate and/or lactate ester hydrolyzes to release acetic and/or lactic acid; wherein the acetic and/or lactic acid catalyzes the hydrolysis of additional acetate and/or lactate ester, and wherein all or a portion of the acetate and/or lactate ester converts at least a portion of the oil-wet solids to water-wet solids.

A nineteenth embodiment which is the method of the eighteenth embodiment wherein the acetate ester comprises methyl acetate, ethyl acetate, propyl acetate, butyl acetate, monoacetin; diacetin; triacetin; glyceryl diacetate; glyceryl triacetate; or combinations thereof.

A twentieth embodiment which is the method of any of the eighteenth through nineteenth embodiments wherein the lactate ester comprises methyl lactate, ethyl lactate, propyl lactate, butyl lactate, trilactin, polylactic acid, poly(lactides), or combinations thereof.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
   placing a composition comprising
      an acid and/or an acid precursor;
      a surfactant;
      a breaker comprising a chelant;
      a microemulsion additive comprising terpenes and terpenoids, sweet orange-oil; and
      an aqueous base fluid,
   into contact with oil-wet solids in the wellbore wherein the composition excludes a mutual solvent precursor; and
   allowing the composition to remain in contact with the oil-wet solids for at least 1 hour;
   wherein the acid and/or acid precursor is selected from the group consisting of acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; sulphinic acid; phosphoric acid; phosphorous acid; phosphonic acid; phosphinic acid; sulphamic acid; aliphatic polyesters; glucono-delta-lactone; glucoheptonic lactone; poly($\epsilon$-caprolactones); poly(hydroxybutyrates); poly(anhydrides); aliphatic polycarbonates; poly(amino acids); polyphosphazenes; poly(ortho esters); and combinations thereof; and
   wherein the surfactant comprises anionic surfactants, amphoteric/zwitterionic surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, modified betaines, alkylamidobetaine, cocoamidopropyl betaine, quaternary ammonium compounds, trimethyltallowammonium chloride, trimethylcocoammonium chloride, or combinations thereof, and
   wherein the chelant comprises dimercaptosuccinic acid, dimercapto-propane sulfonate, $\alpha$-lipoic acid, D-penicillamine, deferoxamine, defarasirox, or combinations thereof.

2. The method of claim 1 wherein the acid precursor is further selected from polyol esters.

3. The method of claim 2 wherein the polyol esters comprise glycerol, glycols, or combinations thereof.

4. The method of claim 2 wherein the polyol esters comprise tripropionin (a triester of propionic acid and glycerol); esters of acetic acid and glycerol; monoacetin; diacetin; triacetin; glyceryl diacetate; glyceryl triacetate; or combinations thereof.

5. The method of claim 1 wherein the acid and/or acid precursor is further selected from methyl lactate, ethyl lactate, propyl lactate, butyl lactate, methyl acetate, ethyl acetate, propyl acetate, butyl acetate, methyl glycolate, ethyl glycolate, propyl glycolate, butyl glycolate, trilactin, polylactic acid, poly(lactides), poly(glycolides), or combinations thereof.

6. The method of claim 1 wherein the acid and/or acid precursor is present in the composition in an amount of from about 2.5 wt. % to about 50 wt. % based on the total weight of the composition.

7. The method of claim 1 wherein the surfactant further comprises ethoxylated nonyl phenol phosphate esters, non-ionic surfactants, cationic surfactants, alkyl phosphonate surfactants, or combinations thereof.

8. The method of claim 1 wherein the surfactant is present in the composition in an amount of from about 0.1 wt. % to about 5 wt. %, based on the total weight of the composition.

9. The method of claim 1 wherein the aqueous base fluid comprises a brine.

10. The method of claim 9 wherein the brine comprises NaCl, NaBr, $CaCl_2$, $CaBr_2$, $ZnBr_2$, sodium formate, potassium formate, cesium formate, or combinations thereof.

11. The method of claim 9 wherein the brine is present in the composition in an amount of from about 40 wt. % to about 90 wt. %, based on the total weight of the composition.

12. The method of claim 1 wherein the composition further comprises a wetting agent.

13. The method of claim 12 wherein the wetting agent comprises crude tall oil, oxidized crude tall oil, lecithin, organic phosphate esters, modified imidazolines and amidoamines, alkyl aromatic sulfates and sulfonates, or combinations thereof.

14. The method of claim 12 wherein the wetting agent is present in an amount of from about 0.01 vol. % to about 3 vol. %, based on the total volume of the composition.

15. The method of claim 1 wherein the composition comprises a rate adjustment material, a viscosifying agent, a weighting agent, a fluid loss control agent, a thinning agent, or combinations thereof.

16. The method of claim 15 wherein the rate adjustment material comprises diethyleneglycol monoformate, diethyleneglycol diformate, monoethyleneglycol diformate, monoethyleneglycol monoformate, polylactic acid, lactate esters, or combinations thereof.

17. The method of claim 1 wherein the oil-wet solids comprise a filter cake.

18. A method of servicing a wellbore comprising:
placing a composition comprising an acetate and/or lactate ester and excluding a mutual solvent precursor into contact with oil-wet solids in the wellbore, the composition further comprising:
a breaker comprising a chelant, and
a microemulsion additive comprising terpenes and terpenoids, sweet orange-oil;
wherein the acetate and/or lactate ester hydrolyzes to release acetic and/or lactic acid;
wherein the acetic and/or lactic acid catalyzes the hydrolysis of additional acetate and/or lactate ester; and
wherein all or a portion of the acetate and/or lactate ester converts at least a portion of the oil-wet solids to water-wet solids, and
wherein the chelant comprises dimercaptosuccinic acid, dimercapto-propane sulfonate, $\alpha$-lipoic acid, D-penicillamine, deferoxamine, defarasirox, or combinations thereof.

19. The method of claim 18 wherein the acetate ester comprises methyl acetate, ethyl acetate, propyl acetate, butyl acetate, monoacetin; diacetin; triacetin; glyceryl diacetate; glyceryl triacetate; or combinations thereof.

20. The method of claim 18 wherein the lactate ester comprises methyl lactate, ethyl lactate, propyl lactate, butyl lactate, trilactin, polylactic acid, poly(lactides), or combinations thereof.

21. The method of claim 1 further comprising recovering the composition from the wellbore;
oxidizing the recovered composition to form an oxidized composition; and
separating the base fluid from the oxidized composition.

* * * * *